Patented Jan. 9, 1951

2,537,531

UNITED STATES PATENT OFFICE 2,537,531

MOISTURE-SETTING PRINTING INK

Justus Hoyt, Darien, Conn., assignor to Sun Chemical Corporation, New York, N. Y., a corporation of Delaware No Drawing. Application February 27, 1947, Serial No. 731,411

10 Claims. (Cl. 260—14)

1

This invention relates to printing inks, and more particularly to inks which are to be set, or "dried" by applying moisture (for example, as water, steam, spray) immediately after printing, such inks being generally referred to as steam or water setting inks.

This application is a continuation-in-part of my three copending abandoned applications Serial Nos. 440,539; 440,540; and 440,541, all filed April 25, 1942.

Such an ink, in its necessary characteristics, presents the conflicting requirements that while it must have sufficient "press stability" so that in use it will distribute readily upon the printing rolls, without setting up or hardening or pulling away from the rolls, nevertheless it must be sufficiently sensitive and responsive to the moisture which is applied after printing so that it will dry or set—i. e., harden to non-offsetting condition—with great rapidity. In fact, to meet the requirements of modern high speed printing presses, such an ink must set almost instantly upon the moisture application. Such an ink and the process of setting or drying it obviously would lend themselves to the use of much simplified and less expensive equipment and to simplicity and decreased cost in pressroom operations as compared, for example, with the so-called "heat drying" inks; which are characteristics especially desirable and advantageous in high speed printing. Nevertheless these conflicting requirements present great inherent difficulties that have heretofore seriously limited the use of such inks and of this process, even though the simplicity and lack of expense would make the utilization thereof extremely desirable.

"Press stability" in an ink is the result of the concurrence of two primary factors or characteristics of the printing ink in the case of ink materials comprising a solid binder component dissolved in a liquid component. In this type of ink, the first factor required for adequate press stability, is that the liquid or solvent component shall have such characteristics that it will not cause drying or setting of the ink before printing. This involves first that the solvent shall be such that it will not so evaporate at pressroom temperatures, and on the press, as to cause premature setting or drying. It involves, secondly, that the ink material be sufficiently resistant to the action of moisture in the atmosphere in the vicinity of the ink fountain and press rolls that premature setting of the ink material will not occur.

With respect to inks widely used in the past and which were set by absorption or by evapora-

2 tion of the solvent or by oxidation, there has been no operating difficulty arising out of insufficient moisture-resistance in the inks since the solvents and binders heretofore selected to satisfy other necessary ink making characteristics such as length, flow, tack and the like were likewise inherently sufficiently water resistant to be not adversely affected even by very high relative humidities in the pressroom.

However, with the use of the moisture or steam setting inks and processes which require the use of water-miscible, hygroscopic solvents in order to permit moisture setting, this second characteristic of moisture-stability on the press becomes of great and controlling importance, while the importance of the first characteristic of evaporation-stability remains undiminished.

In the preparation of such inks, therefore, attaining the requisite evaporation-stability does not of itself present a difficult problem as it was common to preserve this characteristic with other types of inks through the use of high boiling solvents. But to permit proper setting of the inks by application of moisture, in the form of water, water vapor or steam or spray after printing, the constituents used must not only be high boiling but must also be so responsive to the addition of water after printing as to achieve the resultant setting of the binder upon the printed surface. Generally stated, the solvents used in these inks must have the property of water miscibility in order that the ink may be diluted by water applied thereto to cause setting of the ink. Water miscible solvents could be used which will mix with and absorb the water of dilution used in setting the ink film, sufficiently to cause the desired rapid hardening of the film by addition of moisture after printing; but the same property would be expected to cause the ink to absorb moisture from the atmosphere while in the ink fountain and on the distributing rolls, and to harden and set prematurely before printing, particularly at high relative humidities in the pressroom. In other words, the moisture-press-stability of such solvents as heretofore used and the inks made therefrom was found to be too low for use except at very low relative humidities in the pressroom.

Likewise, the solid binder components heretofore used in moisture-setting inks, while adequately responsive to moisture-setting treatments, at the same time have generally been unduly susceptible to precipitation by atmospheric moisture when spread in thin films on press rollers operating under conditions of only moderate atmospheric humidity, especially when used in conjunction with solvents heretofore in common use and without correlating the moisture-responsive characteristics of the binder with those of the solvent.

Accordingly, such so-called water or steam setting inks as have been made prior to my invention while satisfactory from the point of view of setting by the application of moisture after printing, have all been unsatisfactory from the point of view of adequate press stability, and of resistance before printing to the effects of relatively high pressroom humidities, for example, above about 50–55% relative humidity.

It is an object of the present invention to provide a printing ink adapted for use in the moisture setting process which has press stability at high relative humidities but which will readily set after printing with the application of moisture (applied, e. g., as water, steam, spray).

It is also an object of the invention to provide a printing ink comprising a solvent component and a binder component which has adequate press stability at high relative humidities, but which is nevertheless so responsive to moisture applied directly after printing that the printed ink will set or dry with such great rapidity as to meet the requirements of present high speed printing.

Another object of the invention is to provide a printing ink composition comprising a solvent component and binder component in which the solvent component and binder component are so selected, with respect to each other, that the composition will be resistant to premature setting and the like under the printing conditions of relatively high humidities to provide such press stability, and yet will be sufficiently responsive to setting when moisture is applied after printing so that they may be readily set or dried by this method.

Another object of the invention is to provide a moisture-setting ink containing a solvent component and a binder component in which the solvent component has predetermined hygroscopic characteristics such that it will take up from contiguous humid atmosphere in the pressroom only a predetermined limited amount of water and in which the binder component has predetermined water-responsive characteristics such that it will not be precipitated by the maximum amount of water taken up by the solvent but will be precipitated rapidly by substantially greater amounts of water such as those applied in a moisture-setting operation.

A further object of the invention is to provide an ink of the character described containing a solvent component and a binder component in which the solvent component has predetermined hygroscopic characteristics such that it will absorb from surrounding humid air not more than a predetermined maximum amount of water and in which the binder component has the property of being substantially completely soluble in a mixture of the solvent component with such predetermined maximum amount of water but will nevertheless be precipitated almost immediately when subjected in the form of a printed film to a moisture-setting treatment.

Another object of the invention is to provide a moisture-setting ink of the character described utilizing a solvent component of predetermined controlled hygroscopicity together with a specially selected binder component having exceptional resistance to precipitation from such a solvent component by atmospheric moisture.

A further object of the invention is to provide such an ink in which the binder component is a special type of phenol aldehyde resin exhibiting an anomalous response to atmospheric moisture when used in inks of the present character.

A further object of the invention is to provide such an ink in which the binder component is a special type of nitrocellulose having exceptionally high resistance to precipitation by atmospheric moisture when used in inks of the present character.

It is a further object of the invention to provide an ink composition comprising a binder component and a solvent component, the solvent component being water miscible but of such controlled stability characteristics, both as to evaporation and hygroscopicity, as to remain stable and non-hardening on the press but which can nevertheless be set immediately when moisture is applied thereto after printing.

A still further object of the invention is to provide a printing ink composition of the character described in which is utilized a solvent component of controlled hygroscopicity low enough to provide moisture stability on the press, even at high pressroom humidities, and yet so responsive to moisture applied after printing as to permit rapid setting after printing to meet high speed press requirements.

A still further object of the invention is to provide a printing ink composition of the character described in which is utilized a solvent component of controlled hygroscopicity low enough to insure complete moisture stability on the press, even at high humidities, and even when used with extremely moisture responsive binder components yet of such character as to permit rapid and complete moisture setting after printing.

It is still another object of the invention to provide a printing ink having a binder material such that it will set or dry with such great rapidity as to meet the requirements of present high speed printing, when moisture is applied after printing, but which will be sufficiently resistant to the effect of atmospheric humidity so that moisture setting on the press mechanism will not occur even at high relative humidities.

Another object is to provide a binder constituent, for an ink, which is such as to have superior press stability characteristics with respect to moisture setting on the press so that water miscible solvents of relatively high hygroscopicity as hereinafter defined can be used and the ink still be free from objectionable setting on the press rolls even at high relative humidities.

It is an object of the present invention to provide a printing ink composition which has press stability at predetermined high relative humidities, but which is adapted for use in the moisture setting process and will readily set after printing with the application of moisture (applied, e. g., as water, steam, spray).

It is still another object of the invention to provide such a printing ink composition having a solvent component and a binder material comprising nitrocellulose and which ink composition has press stability at high relative humidities in the pressroom and which is also adapted for use in the moisture setting process and can be readily set after printing with the direct application of moisture.

Another object is to provide an ink composition in which nitrocellulose is used as a constituent of the binder and which is so resistant to atmospheric moisture as to be press stable throughout the range of humidities encountered in pressroom operations.

Other objects and advantages of the invention will be apparent from the description when taken in connection with the appended claims.

In preparing inks according to my invention I select their components so that their final properties are such that they fall within the narrow range of characteristics imposed by the moisture setting process, that is, between (1) the ability to set by the addition of the moisture to the printed ink on the one hand, which requires a moisture precipitable ink and (2) press stability on the other hand which requires that the character of the ink be so limited and controlled that it will resist setting or precipitation by atmospheric moisture even at high relative humidities.

The humidity in pressrooms is usually relatively high even where air conditioning is employed. If the air conditioning is not used, the relative humidity may vary widely from as low as 25% RH up to 85–90% RH. For convenience the phrase "relative humidity" is sometimes hereinafter designated as "RH." The latter high humidities are about the highest usually attained in a pressroom even when the outside relative humidity approaches 100% RH. And in an unconditioned pressroom there is never any certainty as to when these excessive humidities may occur, as there may be factors unintentionally present increasing the press room relative humidity in addition to whatever relative humidity it would ordinarily attain under atmospheric conditions, so that the ink under such circumstances should be so resistant to the effect of atmospheric moisture as to be press stable under the high humidities encountered.

The moisture responsive characteristics of the binder which are of significance for the purposes of my invention, are those characteristics relating to the tendency of the binder to be precipitated by atmospheric moisture when the ink containing the binder is spread in thin films on the press rollers of a printing press under conditions of press operation, it being understood, of course, that the binder must be of such character as to be precipitated after printing when moisture is applied as described.

This behavior toward atmospheric moisture has been found to be entirely diffeernt from and non-analogous to the effect of applied water as used in the moisture setting process, and is also entirely unrelated to the customary dilution test (described hereinafter at page 17, beginning at line 9) employed in determining the so-called tolerance in solution of various binder materials to added non-solvents.

The desired high press stability may be attained by using a solvent which is sufficiently resistant to the absorption of moisture from the air to prevent precipitation of the binder on the rolls and yet is such that the binder will be quickly precipitated after printing when the moisture (in the form of water, steam, water spray, and the like) is applied directly to, or into, the solvent or ink. That is, the solvent may readily receive the sufficiently large quantity of water or moisture to precipitate out the binder when relatively large quantities of moisture are applied directly to the printed films even though it may not absorb water from mere contact with the air fast enough or in sufficient quantities to precipitate the binder on the press, so that press stability may be attained and likewise ready and rapid precipitation after printing.

I have found that by properly selecting a solvent having hygroscopicity characteristics (as hereinafter defined) so that there will be no objectionable moisture absorption on the press rolls, a binder may be used satisfactorily which would be completely lacking in press stability if used with a solvent lacking such low hygroscopicity characteristics, for example adequate press stability for use up to about 50% RH can be secured in inks using such an extremely moisture responsive binder such as the maleic acid rosin glyceride type resin described in Ellis Patent 2,063,542 by selecting a suitably high boiling solvent from which the binder may be precipitated by the addition of water and which has hygroscopicity characteristics such that (as hereinafter defined) at 79% humidity at temperatures between 20–30° C. said solvent is in equilibrium with water in a ratio not more than approximately 30% water to not less than approximately 70% solvent.

For determining the hygroscopicity characteristics of the solvent—i. e. its receptivity and capacity for absorbing moisture from the air—the following test may be used, in which test the equilibrium point between water and solvent is determined at a constant humidity. Several mixtures of the solvent with water are made up with varying ratios by weight. The ratios of solvent to water should vary over such a range that some will represent a mixture above the equilibrium point and others will be below it. These mixtures are then placed in a closed desiccator over a solution which produces a constant humidity at the temperature of the test. (For example, a saturated solution of ammonium chloride yielding a constant humidity of 79.2 to 79.5% in a closed space at temperatures between 20–30° C. See International Critical Tables vol. 1, pp. 67–68.) The samples are weighed before placing them in the desiccator and are subsequently weighed at intervals, and the results are plotted on rectangular co-ordinate paper, plotting the change in weight percent of water against time in days. Some of the samples will lose weight, others will gain weight. In the case of the solvent suitable for use in the compositions of this invention, all are of such characteristics at these temperatures that practically no evaporation of the solvent occurs, so that any gain or loss in weight of the sample is attributable to a gain or loss of water. After a sufficient length of time, usually a few days, the trend of the curves can be observed, and they can be extended until an intersection is obtained between those which have gained weight and those which have lost weight. This point may be considered, hereunder, the theoretical equilibrium point at which a mixture having those particular proportions of water to solvent would neither gain nor lose weight. This point serves as an index of hygroscopicity.

A very satisfactory solvent for binder material in inks of this sort is diethylene glycol but unfortunately its hygroscopicity or capacity for absorbing moisture from the atmosphere is so high that it is only suitable for use at very low humidities. I have found, however, that by a suitable admixture of diethylene glycol with a non-hygroscopic solvent constituent such, for example as dimethyl phthalate, in properly limited proportions, the resulting composite solvent component will have adequate capacity for dissolving the binder and, by the hygroscopicity test described above, will have a hygroscopicity index sufficiently low to assure stability on the press throughout the range of humidities encountered in actual press room operations up to approximately 50% RH. An example of an ink which will set substantially instantaneously by the application of water to the printed films, which will print satisfactorily, and which has the degree of press stability referred to is as follows:

*Example I*

|  | Parts by weight |
|---|---|
| Binder (maleic type resin specified above) | 35 |
| Diethylene glycol | 29 |
| Dimethyl phthalate | 16 |
| Carbon black | 20 |
|  | 100 |

The composite solvent component of the above ink, tested as above described, is at equilibrium with water vapor of the atmosphere at the conditions described for the test when the mixture comprises approximately 28% water and 72% of the total solvent component. The dimethyl phthalate used above is illustrative of a non-hygroscopic constituent which may be added in limited amount to a water miscible solvent of relatively high hygroscopicity to reduce the hygroscopicity as desired, but other solvent constituents may be used such as dimethyl phthalate, diethyl phthalate, dibutyl phthalate, tricresyl phosphate, blown castor oil, and the like, all of which are substantially non-hydroscopic or of such low or negligible hygroscopicity as to have the desired reducing effect upon the hygroscopicity of the total solvent component, it being merely required for practical operation with inks of the character referred to herein that sufficient water miscible solvent constituent be present to insure adequately rapid setting when moisture is directly applied after the imprinting. And by means of the hygroscopicity test described, the proper proportion of water miscible and non-hygroscopic constituents to provide a composite solvent of the desired hygroscopicity may be readily determined and also the hygroscopicity of a water miscib'e solvent alone may be determined and the conditions under which it may be used, to meet practical operating conditions, without the addition of a non-hygroscopic constituent.

By proper selection of a solvent with respect to the moisture responsive characteristics of the binder, inks may be prepared which will be stable upon the press throughout the range of humidity conditions encountered in pressroom operations and which will also precipitate and set immediately upon the application of moisture after printing. And if the solvent is selected as to its hygroscopicity characteristics as herein set forth so that at 79% humidity and temperatures between 20-30° C. said solvent reaches equilibrium with the water in the atmosphere in a ratio of not more than approximately 30% water to not less than approximately 70% solvent, then even the most water responsive binders may be satisfactorily used at humidities up to approximately 50%; and with such a solvent and a less water responsive binder the ink will withstand even higher operating humidities and inks may be prepared which will be stable upon the press throughout the range of humidity conditions encountered in actual pressroom operations. Where the solvent is a composite one it must contain sufficient of the water miscible constituent so that enough water will be taken up by the solvent when moisture is applied after printing to cause separation or precipitation of the binder; and with water miscible solvents such as the glycols, as referred to above, and non-miscible constituents such as the dimethyl phthalate, and the like, also referred to above, satisfactory results will be attained if the water miscible constituent constitutes a major portion of the solvent and is preferably in excess of 60% of the solvent component.

To provide moisture-setting inks which are nevertheless stable on the press rolls even when exposed to unusually high conditions of atmospheric humidity ranging up to 60%, 75% and even 85% RH, I utilize, in conjunction with a solvent component having the predetermined low hygroscopicity characteristic previously described, a special binder component having exceptionally high resistance to precipitation from such a solvent by atmospheric moisture while still exhibiting the requisite quick response to moisture-setting treatments.

Also, I may provide inks of satisfactory press stability using solvents of hygroscopicity higher than heretofore usable with resins such as the maleic type referred to and resins prior to my invention.

The usual test for determining the resistance of a binder material to precipitation by a non-solvent is to dissolve the binder in a solvent and then to add a non-solvent to the solution by small increments until the binder separates out of solution or is precipitated.

The test therefore is strictly a dilution test, and attempts to correlate the results of this test with moisture-responsive characteristic of the binder were unsuccessful.

For example, as tested by the dilution test, the hereinabove mentioned maleic acid rosin glyceride resin described in Ellis U. S. 2,063,542 when dissolved in a water miscible solvent appears to be one of the most resistant to precipitation by dilution of the solvent with water. However, under conditions of actual use on the press rolls when used in an ink containing a solvent of the character heretofore used in so-called steam or moisture set inks in the industry, this resin is found to be extremely water responsive, i. e. extremely susceptible to precipitation by atmospheric moisture when spread in thin films on press rollers operating under conditions of only moderate atmospheric humidity. Conversely it has been found that other resins which in solution, by the dilution test, will tolerate much less water than the resin mentioned above, or even substantially no water, are much more resistant to precipitation on the press rolls by high atmospheric humidities when used as binders in ink materials.

I have found that the 100% phenol aldehyde resins of the Novolac type present an astonishing anomaly in that while certain of them precipitate out of solution, under the dilution test, with very small or negligible quantities of water, nevertheless inks containing these certain resins display such press stability that upon the press rollers they will withstand relatively very high atmospheric humidities encountered in pressroom operation, although, for some reason which I am not able to explain, others of these 100% phenol-aldehyde Novolac resins will tolerate even more water in solution than the maleic resin referred to above, by the dilution test, but despite this, display the same high degree of press stability in actual operating conditions as those other Novolac resins referred to above. And when such a resin is in solution in a solvent of suitably controlled hygroscopicity (as hereinabove defined) it will readily withstand the highest humidities encountered in pressroom operations.

While it is true that on rare occasions, in some pressrooms, the relative humidity may be as high as the 85-90% referred to above, nevertheless this is a rare occurrence and in pressrooms which are not air conditioned the normal humidities encountered will not exceed 75% and with air conditioned pressrooms the humidity ordinarily will be maintained at approximately 50-60% R.H.

I have discovered that these 100% phenolaldehyde Novolac resins have the unexplained characteristic as referred to above of providing such high stability upon the press rolls with respect to atmospheric moisture that with solvents having such hygroscopicity, as herein defined, that the solvent reaches equilibrium with water in the atmosphere in a ratio as high as 42% water and 58% solvent—i. e. the solvent when tested as explained at 79% humidity, at 20-30° C., reaches equilibrium with the water in the atmosphere when the ratio of water to solvent is 42% to 58%—the ink will be press stable throughout the normal range of operating humidities as specified; and also an ink may be provided which will be stable at those rarely occurring extraordinarily high humidities referred to, by using a solvent having such hygroscopicity characteristics that it reaches equilibrium with the water in the atmosphere in a ratio of not more than approximately 30% water to not less than 70% solvent.

The binders referred to belong to the class of resins known as the 100% phenol-aldehyde resins. In addition they are of the Novolac type, that is they are of the type prepared using an excess of the phenolic body and in the presence of an acid catalyst. These are of the type that remain permanently soluble and fusible, i. e., they are non-heat convertible. All of these Novolacs are soluble in alcohol, and those which are suitable for my purposes, are also soluble in the glycols and polyglycols. The resins which I use may be condensation products of mono or dihydroxy phenols which may be substituted phenols such as aryl or alkyl substituted phenols condensed with a body containing a reactive methylenic group such as an aldehyde, hexamethylene tetramine or other similar well known condensing agent of this nature. The terms 100% phenol-aldehyde resins, or "pure" phenol-aldehyde resins are used in contra-distinction to the term "modified" phenolic resin as the latter indicates that a third substance or "modifier" such as an oil, resin, or the like, is used in the preparation of the resins in addition to the phenolic body and the methylenic body. An example of such a resin is that known commercially as "Amberlite P-100". Using such resins, I prepare inks which have adequate press stability both from the standpoint of evaporation-stability, and of moisture-stability by the use of a single binder constituent, and a composite solvent component such as hereinabove disclosed or, if desired, a single high boiling glycol such as diethylene glycol may be used as the solvent component. Any suitable pigment may be used. Satisfactory commercial results have been secured using diethylene glycol which has a boiling point of about 245° C., and has high solvent power for such resins.

Other suitably high boiling water miscible solvents having boiling points above about 200° C., and which are structurally adapted to the moisture setting process—that is, to rapid dilution with water in the printed ink film after printing can be used, and among these may be mentioned the polyglycols or mixtures thereof and the glycol ethers.

An example of a satisfactory ink is given below:

*Example II*

| | Parts by weight |
|---|---|
| 100% phenol-aldehyde Novolac resin | 32 |
| Diethylene glycol | 48 |
| Carbon black | 20 |
| | 100 |

This ink was printed on a Hacker proof press and subjected to moisture setting on a day when the relative humidity was 70% in the pressroom. The ink ran satisfactorily showing excellent press stability for 90 minutes without renewal of the ink or the addition of any fresh ink. This is a very severe test, as in ordinary operation fresh ink is continuously circulated from the fountain.

In order to compare the ink of the foregoing Example II with prior art inks using binder materials which represented the best available up to the time of my invention, another ink was made up having identical composition except that a maleic acid modified rosin glyceride type resin, as above referred to, was used as the binder. On the same day under identical conditions an attempt was made to print this ink. However as it would not distribute upon the rolls nor even "follow" the rolls, it was impossible to obtain a single print even immediately on placing it on the Hacker proof press.

While Example II represents an ink suitable for use under the most severe humidity conditions which would be likely to be encountered in ordinary circumstances, there might arise extraordinarily severe conditions of humidity, and for such extraordinary circumstances, I may use an ink compounded of my extremely water resistant binder, together with one of the less hygroscopic solvents described in the earlier portions of this application.

For such a purpose the following example is illustrative:

*Example III*

| | Parts by weight |
|---|---|
| 100% phenol-aldehyde Novolac resin | 35 |
| Diethylene glycol | 29 |
| Dimethyl phthalate | 16 |
| Carbon black | 16 |
| | 100 |

Substantially the same results will be attained if dipropylene glycol is substituted for the composite diethylene glycol dimethyl phthalate solvent in such an ink.

I have also found that other 100% phenol-aldehyde resins of the general type described above and known commercially as Amberlite K-6-S, Bakelite 4036, Bakelite 1329, Durez 525, and Durez 570, give substantially the same results and, for the purposes of this application, are therefore included under the description of 100% phenol-aldehyde resins of the Novolac type.

Various pigments and dyes may be added to any of the above described compositions, as well as waxes, wetting agents, and other modifiers, commonly used in such compositions to obtain the desired effects.

Where printed films of great superiority with respect to toughness, scratchproofness, rub-resistance and appearance are desired a binder constituent should be utilized which, in conjunction with the remainder of the binder component, will give these desired superior characteristics. It has been known for many years that nitrocellulose will impart such characteristics when used as a binder constituent in compositions such as lacquers. Nitrocellulose also has been used in inks as a binder constituent. However, although nitrocellulose lacquers have been used extensively for many years it has also been long recognized that commercial nitrocellulose is affected extremely by moisture especially in thin films and this has necessarily been taken into account in selecting the field and conditions for its usage. According to the present invention, however, it is now possible to utilize nitrocellulose as a binder in a printing composition and by proper selection of the solvent and of the nitrocellulose with respect to its nitrogen content adequate press stability may be secured and the ink nevertheless can be of such character that it will set readily upon the direct application of moisture, as in the steam or moisture setting referred to. And by proper selection of other binder constituents printing compositions may be secured which will be stable upon the press rolls in operation even at the highest pressroom humidities encountered.

Also as stated I have found that for satisfactory results the conflicting requirements of press stability despite the humidity in the atmosphere of the pressroom on the one hand and of substantially instantaneous precipitation of the binder upon the direct application of moisture on the other can be attained by proper selection of component materials. Further I have found that if nitrocellulose of properly low nitrogen content of the order of not to exceed about 11.15% of nitrogen is utilized as a binder constituent satisfactorily usable press stability on the press rolls will be secured in operation. And if water miscible solvents of unusually low hygroscopicity are employed conditions of high pressroom humidity may be encountered without adversely affecting the press stability even though the printing composition itself is sufficiently water responsive to the direct application of water so that it will set properly when water is applied as in the form of steam, water, spray, or the like.

I have found that the nitrogen content of the nitrocellulose used is important and a controlling characteristic; and that by the use of a low nitrogen nitrocellulose of about 11.15% or less will give press stability such that the printing composition containing such a binder constituent may be used satisfactorily under normal humidity conditions, i. e., up to about 50% RH.

However if such a low nitrogen nitrocellulose constituent is combined with a composite solvent component which is miscible with water but which has a sufficiently low hygroscopicity, as hereinabove defined, the resulting composition will not be adversely affected by moisture from the air, even at relatively high humidity conditions, to adversely affect press stability, but still can be set with adequate rapidity upon direct application of moisture.

In order to be a satisfactory solvent for such nitrocellulose containing steam setting inks for use at relative humidities up to about 60% RH, the hygroscopicity in terms of the test hereinabove described should be not appreciably greater than the 30% to 70% ratio of water to solvent at the equilibrium conditions described above.

The press stability of such a nitrocellulose printing composition improves, other constituents remaining the same, as the nitrogen content of the nitrocellulose decreases. Also if the nitrogen content of the nitrocellulose constituent is above 11.15% referred to, the press stability tends to decrease but with a nitrocellulose having a nitrogen content not exceeding about 11.75% adequate press stability may be provided if used under conditions of not to exceed approximately 50% RH. However, if a solvent is used in which the water-solvent ratio is lower than the 30% to 70% ratio above described, the ink containing such solvent component will be more press stable for the nitrocellulose used therein. And by selecting a solvent having a sufficiently low hygroscopicity, as defined, nitrocellulose constituents having nitrogen content of 11.15-11.75% may be used at pressroom humidities in excess of 50%; and by using nitrocellulose of nitrogen percentage below such a range higher humidities may be met in operation without setting on the press.

I have also discovered that if other binder constituents, such as the 100% phenol aldehyde Novolac resins referred to hereinabove are utilized along with such a nitrocellulose to provide a composite binder component, the press stability of the resulting ink also is markedly increased.

In each ink its press stability may be predetermined, generally, by determining the hygroscopicity of the solvent component in accordance with the test above described; and by using a solvent of sufficiently low hygroscopicity and a composite binder component comprising nitrocellulose having not to exceed about 11.15% nitrogen and resin of the Novolac type referred to, with binder constituents properly coordinated in proportion to each other, such a nitrocellulose ink may be prepared which will be press stable at relative humidities as high as those ordinarily encountered in normal pressroom operations, i. e. up to approximately 85% RH.

As illustrative of several compositions containing nitrocellulose as a binder constituent, each of which has proved satisfactory in press stability within the range of relative humidities encountered in pressroom operations, and each of which also has the desired qualities for a satisfactorily usable ink (e. g. length, flow, tack) the following are given:

*Example IV*

| | Percent by weight |
|---|---|
| ¼″ SS nitrocellulose (dry) | 7.5 |
| Alcohol of dehydration | 4.3 |
| Resin | 15.5 |
| Dimethyl phthalate | 4.1 |
| Dipropylene glycol | 44.3 |
| Wetting agent (sulfonated fish oil) | 4.0 |
| Black pigment | 20.0 |
| | 100.0 |

This composition was placed on a Hacker proof press on a day when the relative humidity in the pressroom was 70%. Proofs were printed, and set by the application of steam impinging on the sheet immediately after printing, and produced very satisfactory prints in all respects. After 30 minutes on the press, using the same ink continuously without renewal with fresh ink, the composition still printed satisfactorily with no indication of setting up on the rolls or spotting of the print due to the high humidity. This is a very severe test, as ordinarily on a press in commercial use, fresh ink is fed continuously to the rolls from an ink fountain, so that the moisture received by the ink from the air is continually compensated for by fresh ink which has not been exposed to the atmosphere. At 62% RH this ink printed satisfactorily for 90 minutes, and at 82% RH ran for 10 minutes under the proving conditions described and such an ink would be satisfactorily usable under normal pressroom humidities.

The composite dimethyl phthalate and dipropylene glycol solvent of the above formulation attained equilibrium with the moisture of the atmosphere, as above defined, with a water to solvent ratio of approximately 25% to 75%, and in actual normal printing operations such an ink would be satisfactorily press stable at relative humidities up to the order of approximately 85%.

It should be explained that commercially available nitrocellulose heretofore has been generally referred to as "SS," "AS," and "RS." The nitrogen content of each of these is recognized as within a substantially usual range. For purposes of simplicity herein in description, nitrocellulose having a nitrogen content of from about 10.0% to about 11.15% is herein, for convenience, referred to as "SS" nitrocellulose, and nitrocellulose having a nitrogen content from 11.15 to 11.75% is referred to as "AS" and one having a nitrogen content in excess of 11.75% is referred to generally as "RS."

As explained the nitrogen content of the nitrocellulose, other constituents remaining the same, is an important, and even completely controlling, factor for securing press stability in these moisture setting inks. While the ink of the formulation above described has such characteristics as to be press stable in actual printing operations throughout the range of pressroom humidities encountered, the substitution of an AS nitrocellulose, which has a nitrogen content in excess of the SS but not exceeding approximately about 11.75%, would have less press stability than such formulation and would print satisfactorily in actual pressroom operations throughout a substantial portion of the normal range of humidities encountered in pressrooms and when printed on the proof press, at relative humidities of approximately 60 to 70% RH would demonstrate its satisfactory characteristics for printing operations; whereas this same ink having substituted therein a nitrocellulose of nitrogen content above about 11.75%, i. e. an ink in the RS range, when tested on the proof press on the same day and with a relative humidity of 70% failed to produce any satisfactory prints; but such an ink might operate satisfactorily on the press-rolls at humidities of approximately not to exceed 60% RH.

Another satisfactory composition using however the slightly higher nitrogen content, or a nitrocellulose within the AS range, is given below:

*Example V*

| | Percent by weight |
|---|---|
| ½" AS type nitrocellulose | 7.8 |
| Alcohol of dehydration | 4.2 |
| Resin | 15.7 |
| Dimethyl phthalate | 12.0 |
| Dipropylene glycol | 36.3 |
| Wetting agent (sulfonated fish oil) | 4.0 |
| Black pigment | 20.0 |
| | 100.0 |

This composition was printed on a Hacker proof press at 63% relative humidity, and was set by the application of steam impinging on the sheet immediately after printing. This composition yielded satisfactory prints for about 15 minutes, before a slight setting up on the rolls became noticeable.

The solvent of this Example V has a hygroscopicity index, as defined, of 20% of water to 80% of solvent. As indicative of the influence of the hygroscopicity characteristics of the solvent with respect to press stability of the ink, another ink was made up identical in composition with Example V except that an equal percentage of diethylene glycol was substituted for the diproylene glycol; such solvent having a hygroscopicity index of 32% water and 68% solvent. The resulting ink was not satisfactorily usable at the relative humidity of 63%, but was satisfactorily usable at a relative humidity of about 50%. And by substituting a nitrocellulose of lower nitrogen content, such as the SS referred to, this substituted solvent would operate satisfactorily under relative humidity substantially increased above 63% RH.

Another, and especially satisfactorily usable ink containing nitrocellulose, is as follows:

*Example VI*

| | Percent by weight |
|---|---|
| ¼" SS nitrocellulose | 6.4 |
| Alcohol of dehydration | 3.5 |
| Resin (100% phenol-aldehyde-Novolac) | 12.8 |
| Dimethyl phthalate | 12.0 |
| Dipropylene glycol | 41.3 |
| Sulfonated fish oil | 4.0 |
| Carbon black | 20.0 |
| | 100.0 |

This composition was printed on a Hacker proof press on a day when the relative humidity in the pressroom was 83%, and worked satisfactorily on the press, with no lack of distribution and no pulling away from the rolls. The test was continued for 40 minutes, during which time the satisfactory printing qualities persisted, and when the test was discontinued, the ink was still printing and behaving on the press in a satisfactory manner.

By thus coordinating the use of nitrocellulose of low nitrogen content and a solvent of low hygroscopicity and in addition a binder constituent such as the 100% phenol aldehyde Novolac type, an ink is secured which will be press stable at even the highest humidities encountered in press room operations, which has satisfactory printing qualities, and which will set with the required great rapidity when moisture is directly applied after printing.

Where a composite binder is used comprising a resin, the resin used must be of such character that it is compatible with the nitrocellulose and both binder materials will be soluble in the solvent used, whether a composite solvent or a single solvent constituent be used.

As has been indicated, other non-water miscible solvent constituents may be used in place of dimethyl phthalate, which when admixed with the water miscible solvent constituent will reduce the hygroscopicity of the composite solvent component. Other such solvent constituents which are usable with nitrocellulose and resins of the character above specified are, for example, diethyl phthalate, dibutyl phthalate, tricresyl phosphate, blown castor oil and the like, all boiling well above the 200° C. mentioned hereinabove, while these have the effect of reducing and controlling the hygroscopicity of the solvent component they also act as film softening and flexibilizing materials or plasticizers.

In view of the above no substantial difficulties are encountered in practice in preparing compositions which will be satisfactorily stable on the press-rolls at lower pressroom humidities, such as those below the 50–55% RH referred to above as relatively high; by using a solvent component of controlled hygroscopicity and with the nitrocellulose having a limited nitrogen content predetermined with respect to the hygroscopicity of the solvent used, an ink composition may be readily formulated to meet predetermined conditions of relative humidity at higher pressroom humidities; and by using a solvent having a sufficiently low hygroscopicity and a nitrocellulose having a sufficiently low nitrogen content, controlled in predetermined manner with respect to each other, a printing composition may be readily formulated which will be press stable at any humidities encountered in actual pressroom operations. Generally stated, the hygroscopicity of the solvent and the percentage of nitrogen content of the nitrocellulose binder material each has an effect upon the capacity of the nitrocellulose composition to withstand the humidity in the air upon the press-rolls in operation, the effect of the two varying generally inversely, i. e., an increase in nitrogen content may be compensated or offset by a decrease in hygroscopicity of the solvent, and vice versa. Conversely, increasing the hygroscopicity of the solvent and the nitrogen content of the nitrocellulose decreases the press stability of the ink composition upon the press-rolls, and decreasing each of these factors increases the press stability.

While the products herein described constitute the preferred embodiments of the invention it is to be understood that the invention is not limited to these precise products and that changes may be made therein within the scope of the invention and without departing from the invention as described and defined in the appended claims.

What is claimed is:

1. A printing ink composition responsive to moisture-setting treatments comprising a solvent component and a binder component; said solvent component including dipropylene glycol as the major constituent thereof and a minor constituent substantially miscible with the major constituent but substantially immiscible with water and boiling above about 200° C., the relative proportions of the solvent constituents being so regulated as to provide a composite solvent component having predetermined hygroscopicity such that a mixture of said solvent component with water in the ratio of approximately not more than 30% water to not less than 70% solvent component will be in moisture equilibrium with contiguous atmosphere at 79% relative humidity and a temperature between 20–30° C.; said binder component comprising nitrocellulose having a nitrogen percentage not less than 11.15% and not more than 11.75%, which is freely soluble in said solvent component and which has the further property of being substantially completely soluble in a mixture of solvent component with the maximum amount of water present in such mixture when in moisture equilibrium with atmosphere at about 50%–65% RH; said ink being press stable under pressroom conditions throughout the normal range of humidity of the pressroom atmosphere and having the property of setting with such rapidity as to meet high speed press requirements when moisture is applied after printing.

2. A printing ink composition responsive to moisture-setting treatments comprising a solvent component and a binder component; said solvent component including dipropylene glycol as the major constituent thereof and a minor constituent substantially miscible with the major constituent but substantially immiscible with water and boiling above about 200° C., the relative proportions of the solvent constituents being so regulated as to provide a composite solvent component having predetermined hygroscopicity such that a mixture of said solvent component with water in the ratio of approximately not more than 30% water to not less than 70% solvent component will be in moisture equilibrium with contigious atmosphere at 79% relative humidity and a temperature between 20–30° C.; said binder component comprising nitrocellulose having a nitrogen percentage not less than 10.0% and not more than 11.15%, which is freely soluble in said solvent component and which has the further property of being substantially completely soluble in a mixture of solvent component with the maximum amount of water present in such mixture when in moisture equilibrium with atmosphere at about 50%–65% RH; said ink being press stable under pressroom conditions throughout the normal range of humidity of the pressroom atmosphere and having the property of setting with such rapidity as to meet high speed press requirements when moisture is applied after printing.

3. A printing ink composition responsive to moisture-setting treatments comprising a solvent component and a binder component; said solvent component comprising a major proportion of dipropylene glycol and a minor proportion of dimethyl phthalate in such relative proportions as to provide a composite solvent component having hygroscopic characteristics such that a mixture of said solvent component with water in the ratio of approximately not more than 30% water to not less than 70% solvent component will be in moisture equilibrium with contiguous atomosphere at 79% relative humidity and a temperature between 20–30° C.; said binder component comprising ink binding material including nitrocellulose having nitrogen content of not less than 11.15% and not more than 11.75%, being freely soluble in said solvent component and having the further property of being substantially completely soluble in a mixture of said solvent component with the maximum amount of water present in such mixture when it is in moisture equilibrium with atmosphere at relative humidities of from about 50% to 65% RH; said ink being press stable under usual pressroom conditions and having the property of setting rapidly such as to meet high speed press requirements when subjected to a moisture setting treatment.

4. A printing ink composition responsive to moisture-setting treatments comprising a solvent component and a binder component; said solvent component comprising a major proportion of a dipropylene glycol and a minor proportion of dimethyl phthalate in such relative proportions as to provide a composite solvent component having hygroscopic characteristics such that a mixture of said solvent component with water in the ratio of approximately not more than 30% water to not less than 70% solvent component will be in moisture equilibrium with contiguous atmosphere at 79% relative humidity and a temperature between 20–30° C.; said binder component comprising ink binding material including nitrocellulose having nitrogen content of not less than 10.0% and not more than 11.15%, being freely soluble in said solvent component and having the further property of being substantially completely soluble in a mixture of said solvent component with the maximum amount of water present in such mixture when it is in moisture equilibrium with atmosphere at relative humidites of from about 50% to 65% RH; said ink being press stable under usual pressroom conditions and having the property of setting rapidly such as to meet high speed press requirements when subjected to a moisture setting treatment.

5. A printing ink composition responsive to moisture-setting treatments comprising a solvent component and a binder component; said solvent component comprising a major proportion of dipropylene glycol and a minor proportion of dimethyl phthalate in such relative amounts as to provide a composite solvent component having hygroscopic characteristics such that a mixture of said solvent component with water in the ratio of approximately 30% water to approximately 70% solvent component will be in moisture equilibrium with contiguous atmosphere at 79% relative humidity and a temperature between 20–30° C.; said binder component comprising ink binding material including nitrocellulose having a nitrogen content of not less than 10.0% and not more than 11.15% and a 100% phenol-aldehyde Novolac resin, said binder component being freely soluble in the solvent component and having the further property of being substantially completely soluble in a mixture of said solvent component with the maximum amount of water present in such mixture when it is in moisture equilibrium with atmosphere at relative humidities of approximately 50%–65% RH; said ink being stable on the press rolls under usual pressroom conditions and having the property of setting with sufficient rapidity to meet high speed press requirements when subjected to a moisture setting treatment after printing.

6. A printing ink composition responsive to moisture setting treatments comprising a solvent component and a binder component; said solvent component including dipropylene glycol as the major constituent thereof and a minor constituent substantially miscible with the major constituent but substantially immiscible with water and also non-volatile at ordinary pressroom temperatures, the relative proportions of the solvent constituents being so regulated as to provide a composite solvent component having predetermined hygroscopicity such that a mixture of such solvent component with water in the ratio of approximately 30% water to approximately 70% solvent component will be in moisture equilibrium with contiguous atmosphere at 79% relative humidity and a temperature between 20–30° C.; said binder component comprising nitrocellulose having a nitrogen percentage not less than 11.15% and not more than 11.75%, which is freely soluble in said solvent component and which has the further property of being substantially completely soluble in a mixture of solvent component with the maximum amount of water present in such mixture when it is in moisture equilibrium with atmosphere at about 50% R. H.; said ink being press stable under pressroom conditions throughout the normal range of humidity of the pressroom atmosphere and having the property of setting with such rapidity as to meet high speed press requirements when moisture is applied after printing.

7. A printing ink composition responsive to moisture setting treatments comprising a solvent component and a binder component; said solvent component including dipropylene glycol as the major constituent thereof and a minor constituent substantially miscible with the major constituent but substantially immiscible with water and also non-volatile at ordinary pressroom temperatures, the relative proportions of the solvent constituents being so regulated as to provide a composite solvent component having predetermined hygroscopicity such that a mixture of such solvent component with water in the ratio of approximately 30% water to approximately 70% solvent component will be in moisture equilibrium with contiguous atmosphere at 79% relative humidity and a temperature between 20–30° C.; said binder component comprising nitrocellulose having a nitrogen percentage not less than 10.0% and not more than 11.15%, which is freely soluble in said solvent component and which has the further property of being substantially completely soluble in a mixture of solvent component with the maximum amount of water present in such mixture when it is in moisture equilibrium with atmosphere at about 50% R. H.; said ink being press stable under pressroom conditions throughout the normal range of humidity of the pressroom atmosphere and having the property of setting with such rapidity as to meet high speed press requirements when moisture is applied after printing.

8. A printing ink composition responsive to moisture setting treatments comprising a solvent component and a binder component; said solvent component including dipropylene glycol as the major constituent thereof and a minor constituent substantially miscible with the major constituent but substantially immiscible with water and also non-volatile at ordinary pressroom temperatures, the relative proportions of the solvent constituents being so regulated as to provide a composite solvent component having predetermined hygroscopicity such that a mixture of such solvent component with water in the ratio of approximately 30% water to approximately 70% solvent component will be in moisture equilibrium with contiguous atmosphere at 79% relative humidity and a temperature between 20–30° C.; said binder component comprising nitrocellulose having a nitrogen percentage not less than 11.15% and not more than 11.75%, and a 100% phenol-aldehyde Novolac resin, the binder component being one which is freely soluble in said solvent component and which has the further property of being substantially completely soluble in a mixture of solvent component with the maximum amount of water present in such mixture when it is in moisture equilibrium with atmosphere at about 50% R. H.; said ink being press stable under pressroom conditions throughout the normal range of humidity of the pressroom atmosphere and having the property of setting with such rapidity as to meet high speed press requirements when moisture is applied after printing.

9. A printing ink composition responsive to moisture setting treatments comprising a solvent component and a binder component; said solvent component including dipropylene glycol as the major constituent thereof and a minor constituent substantially miscible with the major constituent but substantially immiscible with water and also non-volatile at ordinary pressroom temperatures, the relative proportions of the solvent constituents being so regulated as to provide a composite solvent component having predetermined hygroscopicity such that a mixture of such solvent component with water in the ratio of approximately 30% water to approximately 70% solvent component will be in moisture equilibrium with contiguous atmosphere at 79% relative humidity and a temperature between 20–30° C.; said binder component comprising nitrocellulose having a nitrogen percentage not less than 10.0% and not more than 11.15%, and a 100% phenol-aldehyde Novolac resin, the binder component being one which is freely soluble in said solvent component and which has the further property of being substantially completely soluble in a mixture of solvent component with the maximum amount of water present in such mixture when it is in moisture equilibrium with atmosphere at about 50% R. H.; said ink being press stable under pressroom conditions throughout the normal range of humidity of the pressroom atmosphere and having the property of setting with such rapidity as to meet high speed press requirements when moisture is applied after printing.

10. A printing ink composition responsive to moisture setting treatments comprising a solvent component and a binder component; said solvent component comprising a major proportion of dipropylene glycol and a minor proportion of dimethyl phthalate in such relative amounts as to provide a composite solvent component having hygroscopic characteristics such that a mixture of said solvent component with water in the ratio of approximately 30% water to approximately 70% solvent component will be in moisture equilibrium with contiguous atmosphere at 79% relative humidity and a temperature between 20° C.–30° C.; said binder component comprising ink binding material including nitrocellulose having a nitrogen content of not less than 11.15% and not more than 11.75% and a 100% phenol-aldehyde Novolac resin, said binder component being freely soluble in the solvent component and having the further property of being substantially completely soluble in a mixture of said solvent component with the maximum amount of water present in such mixture when it is in moisture equilibrium with atmosphere at relative humidities of approximately 50%–65% RH; said ink being stable on the press rolls under usual pressroom conditions and having the property of setting with sufficient rapidity to meet high speed press requirements when subjected to a moisture setting treatment after printing.

JUSTUS HOYT.

REFERENCES CITED

The following references are of record in the file of this patent:

UNITED STATES PATENTS

| Number | Name | Date |
|---|---|---|
| 2,087,190 | Gessler | July 13, 1937 |
| 2,157,385 | Gessler et al. | May 9, 1939 |
| 2,159,108 | Staudt | May 23, 1939 |
| 2,185,110 | Coleman | Dec. 26, 1939 |
| 2,244,103 | Erickson et al. | June 3, 1941 |
| 2,285,183 | Bernardi | June 12, 1942 |
| 2,300,880 | Erickson et al. | Nov. 3, 1942 |
| 2,336,983 | Erickson et al. | Dec. 14, 1943 |
| 2,389,371 | Kroeger et al. | Nov. 20, 1945 |

FOREIGN PATENTS

| Number | Country | Date |
|---|---|---|
| 339,733 | Great Britain | Dec. 18, 1930 |

OTHER REFERENCES

Gloor, p. 1162, October 1935, Ind. & Eng. Chem.
Durrans "Solvents," 4th Ed., 1938, p. 189, 197, published by Chapman & Hall, Ltd. London.